United States Patent [19]

Carnahan et al.

[11] Patent Number: 5,685,514
[45] Date of Patent: Nov. 11, 1997

[54] SWIVEL BASE APPARATUS AND METHOD OF MAKING A SWIVEL BASE

[76] Inventors: Garnett Carnahan, Rte. 3, Box 18, Nixa, Mo. 65714; Caroline Carnahan, Rte. 3, Box 18, Nixa, Mo. 67514; Sherman Lee, P.O. Box 1111, Nixa, Mo. 65714

[21] Appl. No.: 512,415

[22] Filed: Aug. 8, 1995

[30] Foreign Application Priority Data

Jun. 6, 1995 [CN] China .................. 95 2 44133.0

[51] Int. Cl.$^6$ .................................. F16M 13/00
[52] U.S. Cl. ........................... 248/425; 248/349.1
[58] Field of Search .................... 248/349.1, 131, 248/144, 415, 501, 502

[56] References Cited

U.S. PATENT DOCUMENTS

| | | | |
|---|---|---|---|
| 4,117,627 | 10/1978 | Slinserland, Jr. | 248/349.1 |
| 4,401,287 | 8/1983 | Moeser | 248/349.1 |
| 4,566,664 | 1/1986 | Donald | 298/349.1 |
| 4,659,050 | 4/1987 | Tabayashi | 248/131 |
| 4,919,383 | 4/1990 | Benjamin et al. | 248/349.1 |

OTHER PUBLICATIONS

The Springfield Marine Company 1995 Marine Products Catalog, Nixa, Missouri (Jul. 1994 public availability).

*Primary Examiner*—Leslie A. Braun
*Assistant Examiner*—Willie Berry, Jr.
*Attorney, Agent, or Firm*—Beveridge, DeGrandi, Weilacher & Young, LLP

[57] ABSTRACT

An apparatus which includes a swivel base formed of a first plate and a second plate. The first and second plates each have a central aperture which is defined by a hook-shaped section of the second plate which extends over an interior edge of the first plate defining the first plate's central aperture. The hook-shaped section is preferably circumferentially continuous and fixes the first and second plates together while allowing for sliding engagement between the first and second plates. Bearing members, such as circumferentially spaced ball bearings are provided externally to the hook section and between the plates to facilitate sliding and load distribution. One of the plates includes hollow reception ports for holding the bearing circumferentially in place with respect to that plate while the opposite plate has a continuous riding ring in which the bearings are free to rotate. Each plate has an interior and exterior, preferably horizontal, plate section, and an intermediate section sloping between the adjacent, integral edges of the plate's interior and exterior sections. One manner of assembling the swivel base is described as well as an assembly including two structures to which the exterior sections of the plates are secured.

31 Claims, 5 Drawing Sheets

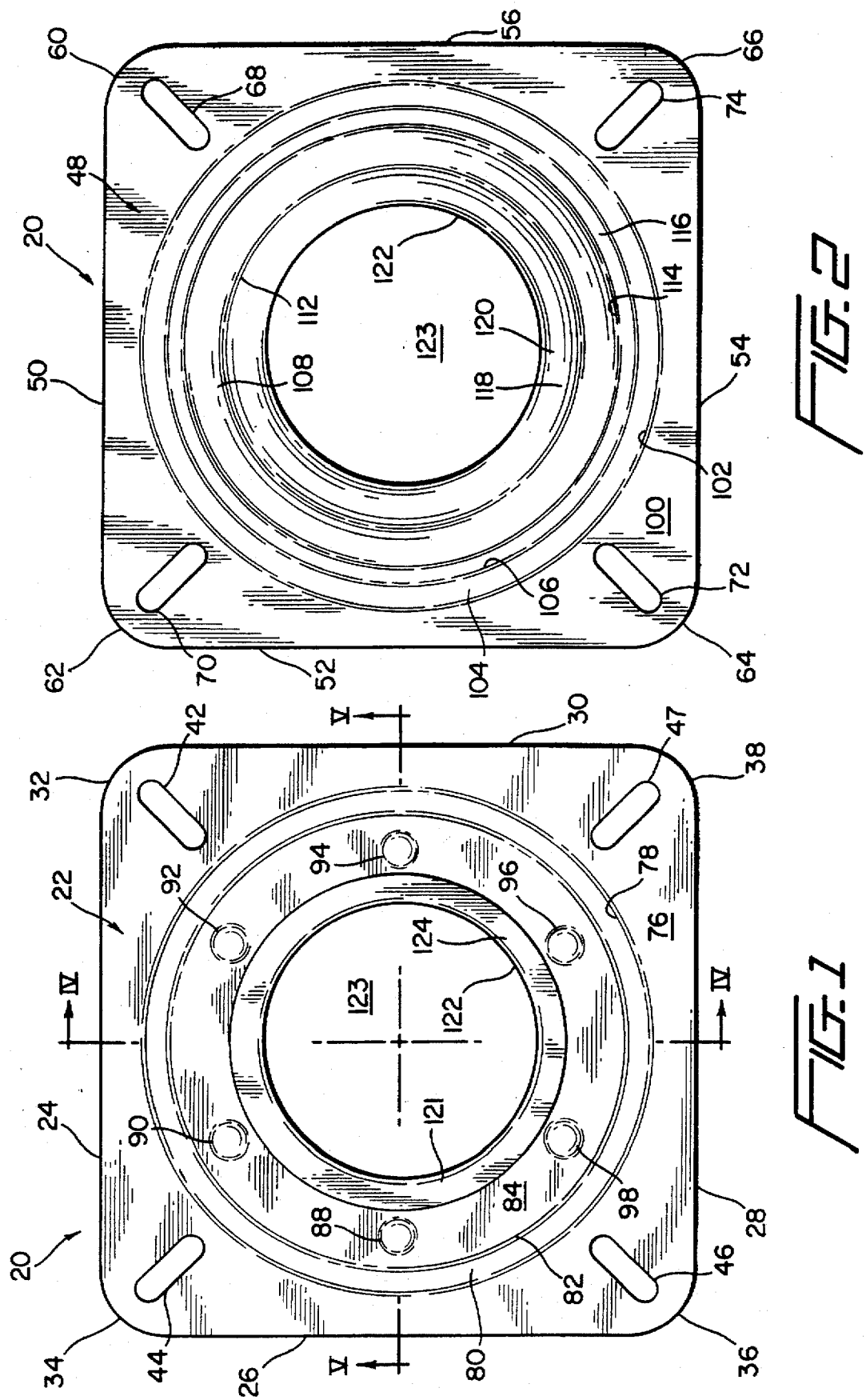

SWIVEL BASE APPARATUS AND METHOD OF MAKING A SWIVEL BASE

1. Field of the Invention

The present invention is directed at a swivel base used for mounting components of devices such as chairs, tables, electrical instrument meters, etc., a method of manufacturing the swivel base, and an apparatus incorporating the swivel base.

2. Background Discussion

FIGS. 12 and 13 illustrate a customary swivel base which includes a first and a second plate 500, 502 having the same configuration and placed in a stacked, mirror image arrangement. As shown in FIGS. 12 and 13, each plate includes a continuous, ring-shaped groove 504, 506 into which steel ball bearings are placed. Extending inwardly in each plate from the continuous groove are a plurality of upwardly sloping, radially extending reinforcement ridges 508 separated by non-raised sections 512. Radially inward of sloping ridges 508 and non-raised sections 512 are provided flat plate sections 514, 516. A central bolt and nut combination 518, 519 passes through a small central aperture formed in each of flat plate sections 514, 516. Washers 520 and 522 are positioned at an exterior surface of the flat plate sections and between the heads of the rivet or bolt member 518.

The conventional arrangement depicted in FIGS. 12 and 13 suffers from a variety of drawbacks. For instance, as chairs and other swivel base supported devices have become more sophisticated, there has been an increased need for electrical wires, force transferring cables, piping etc. to be transferred between the upper and lower units attached to the swivel base. The conventional swivel base requires that such components be passed around the swivel base or that additional holes be cut in the base away from the central axis of the swivel base making these components more susceptible to damage and twisting.

Furthermore, the conventional swivel base construction is relatively heavy in weight and requires a relatively large amount of material for manufacture. Also, since the upper and lower units are typically secured to an exterior portion of the upper and lower plates of the conventional swivel base, large loads are placed on the central interconnection as large force moments develop between the central bolt and the peripheral fasteners. These large force moments increase the chance for breakage or require larger size or thickness materials for increased strength with the latter increasing costs and weight. In addition to an increase in the chance for breakage, the conventional arrangement presents added problems from the standpoint of unsteady rotation due to the highly centralized attachment of the plates.

SUMMARY OF THE INVENTION

The present invention is designed to overcome the aforementioned drawbacks associated with conventional swivel bases like that described above. In other words, the present invention is directed at providing a swivel base which is better suited for the passage of wires and the like between the above and below units secured to a swivel base. The present invention also requires less material, is of less weight, and has a high degree of strength and durability. Further, the present invention provides steady rotation even when the loads are not evenly applied along the periphery of the swivel base, is easy to assemble and is low in cost.

These improvements are made possible by the novel construction of the present invention which combines sliding action with rotation and relies upon an integral component of one of the plates making up the swivel base to maintain the two plates in engagement. In providing these advantages over the conventional swivel base, the invention features a swivel base that comprises a first plate having an external peripheral edge and an internal circular edge that defines a relatively large central aperture. The swivel base also includes a second plate having an external peripheral edge and a hook-shaped internal section, which hook-shaped internal section includes a first component in contact with a first side of the first plate, a curved component extending across the internal circular edge, and a third component in contact with a second side of the first plate. The internal circular edge of the first plate is free to slidingly rotate with respect to the engaging hook-shaped internal section once sufficient torque is present to break the frictional contact between the hook-shaped internal section in the second plate and the upper and lower surfaces (and possibly also the internal circular edge itself) of the first plate.

Between the juxtaposed surfaces of the first and second plates are bearing members and the juxtaposed surfaces include means for receiving the bearing members such that at least one of the plates is free to rotate with respect to the other by a combination of both a sliding and a rolling action.

The top component and curved component of the hook-shaped internal section are each preferably circumferentially continuous. In addition, the curved component defines a central aperture in the swivel base through which wires, piping etc. can readily be inserted. The smooth edge presented by the curved component helps avoid any degradation in the components inserted through the central aperture defined by the curved component. The curved component represents the internal most portion of the swivel base as the hook-shaped internal section receives within its interior the externally positioned internal edge of the other plate. This internal edge of the other plate also represents a relatively large central aperture sized to essentially conform to the curved wall representing the interior of the hook section.

The swivel base also features first and second plates which each include an exterior plate section, an intermediate sloped plate section and an internal plate section which extends inwardly from the intermediate sloped plate section. The external sections of the respective plates lie on parallel planes and the internal sections of respective plates are parallel with one another. Also, the external and internal sections of a common plate extend parallel to each other and are preferably horizontally oriented. Other arrangements are also possible such as the external section having a conical configuration to conform with a conical surface of a unit to be attached to the swivel base.

The sloped section extending between the internal and external sections of each plate is preferably sloped at an angle of from 25°–75° with respect to the horizontal, and, when the two sloped sections are placed in a stacked relationship, form a V-shaped cross-section. The sloped section is also in the shape of a conical ring having an exterior border integrally associated with the external plate section and an internal border integrally associated with the internal plate section. The aforementioned top component extends radially outward from the internal circular edge of the first plate for about 10 to 50% of a radial length of the internal section of the first plate. This provides sufficient engagement for the sliding/friction relationship formed between the internal portions of each of the plates while also providing sufficient room for forming the plates' reception means in which the bearing members (e.g., spherical ball bearings) are received.

In a preferred embodiment the bearing members are spaced in series along a circumferential ring positioned between an external edge of the top component and an external boundary of the internal section of the first plate. One of the first and second plates includes a plurality of reception protrusions for receiving, in a nested fashion, a portion of the ball bearings with the second of said plates featuring a continuous ring-shaped recess which receives the opposite portion of the ball bearings. Preferably, the reception protrusions in the one plate are semi-spherical concave reception areas defined by semi-spherical mounds formed in the one plate. The reception groove formed in the opposite plate is a raised hill having a convex exterior cross-section and a concave interior cross-section and a curvature which essentially conforms to the diameter of the spherical ball bearing to ride therein. Alternatively, the raised protrusions in the first plate are replaced by one or more raised hills that extend circumferentially. In the case of the first plate having a single raised hill, the hill extends in continuous fashion to match that of the other plate, and when a series of circumferentially spaced, curved hills are used, each hill is separated by non-raised sections of the same plate.

In another embodiment of the present invention, which features a limited degree of relative rotation between the two plates, the semi-spherical mounds discussed above are formed in one plate and a series of circumferentially spaced and circumferentially extending grooves are provided in the other plate. The length of the circumferentially spaced grooves is defined by the non-raised ends of the circumferential grooves. These non-raised ends of the grooves define the maximum degree of rotation of the ball bearings that are essentially fixed in place with respect to the semi-spherical mounds in the other plate.

The external periphery of the plates can take on a variety of forms such as a square shape with rounded corners, a star shape, triangular shape with rounded corners, etc. The contour of the above and below positioned plates can also be varied to conform with the unit to be attached to the plate. However, the horizontal external and internal sections with intermediate sloped section is preferred. The two plates can either have a similar external peripheral shape or different peripheral shapes depending upon the fastening area provided in the units to be attached to the swivel base. These units can take on a variety of forms such as components of a chair, components of a table, components of an electrical instrument panel or meter, etc. The external sections in each of the plates include fastener holes that are preferably elongated to facilitate alignment with securement holes formed in the attachment units. The present invention also features an apparatus which comprises the aforementioned units attached to the swivel base and the swivel base itself.

The present invention also includes a method for manufacturing the swivel base. Under one method of the present invention, the step of stacking a first plate onto an underlying second plate such that an upwardly extending circular flange of the second plate extends past a circular interior edge defining a central aperture in the first plate is carried out. Either prior to, at the time of or even after this stacking step, bearing members are positioned so as to lie between the first and second plates such as in the above described reception grooves or reception protrusions formed in the plates. The upwardly extending flange is then bent so as to form a hook-shaped section in the second plate which includes a top component in contact with an upper surface of the first plate, a curved component adjacent the circular interior edge of the first plate and a third component in contact with the lower surface of the first plate. Also, the hook section is bent so as to be continuous circumferentially about the circular interior edge whereby a sliding, friction engagement between the first and second plates is achieved.

The swivel base of the present invention thus moves the central contact area between the two plates much further radially outward from that of the conventional embodiment which uses a central bolt or stud. For example, if the central aperture is 8 cm, the central contact surface of the plates is placed at about 4 cm from the radial center point. Hence, the loading capacity of the plates can be increased in view of this outward shifting of the central contact area. This arrangement also provides for a steady rotation, a savings in material, a reduction in weight, easier cleaning and maintenance, and improved wiring capabilities.

BRIEF DESCRIPTION OF THE DRAWINGS

Particular features of the present invention will be more clearly apparent from the following description of the preferred embodiments of the invention illustrated in the annexed drawings, wherein:

FIG. 1 shows a top plan view of a preferred embodiment of the present invention;

FIG. 2 shows a bottom plan view of the embodiment of FIG. 1;

DETAILED DESCRIPTION OF THE PREFERRED EMBODIMENT

Figure 3:
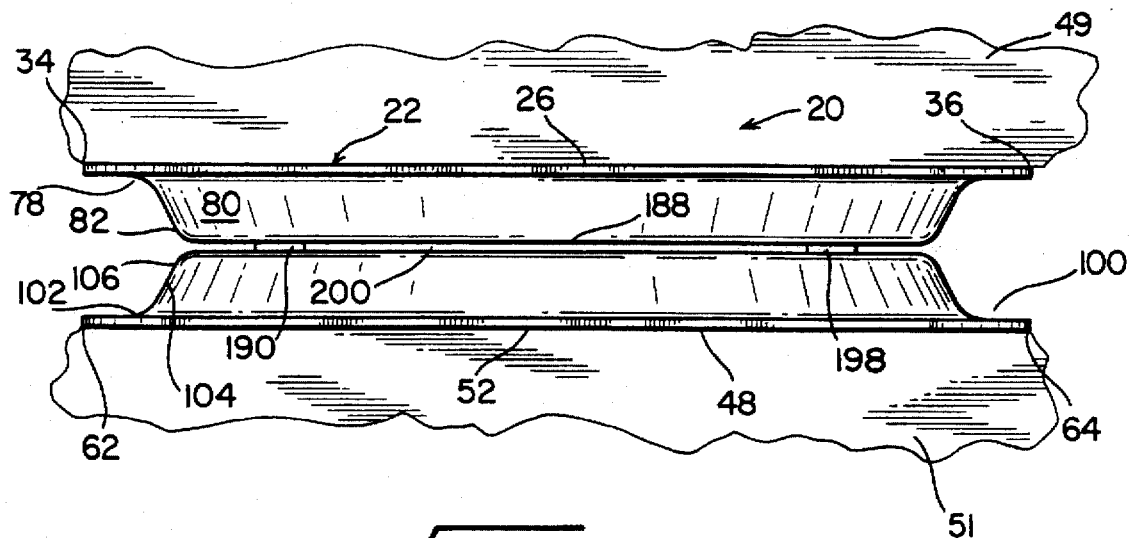
FIG. 3 shows a side elevational view of the left side of the embodiment shown in FIG. 1 with an added depiction of units attached to the swivel base of FIGS. 1 and 2.
Figure 11:
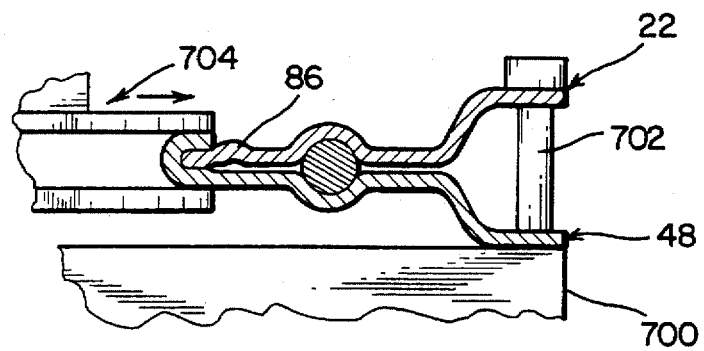
FIG. 11 shows a cross-sectional, cut away view of an alternate method for forming the hook section.

FIG. 1 shows a top plan view of a preferred embodiment of swivel base 20 of the present invention. Swivel base 20 features top plate 22 which is preferably formed of steel or other material having high strength, durability and workability. As illustrated in FIG. 1, plate 22 includes four sides 24, 26, 28 and 30 which are essentially of equal length so as to form a square shaped external periphery (although as discussed below a variety of shapes for plate 22 are possible). Adjacent sides are joined by rounded off corners designated 32, 34, 36 and 38. Radially inwardly of these rounded corners are positioned a plurality of fastener apertures 42, 44, 46 and 47 which are in the form of elongated slots extending in a radial direction in the corner areas of the square shaped plate 22.

FIG. 2 shows a bottom plan view of swivel base 20 which illustrates bottom plate 48. Bottom plate 48 is preferably formed of a material similar to that of plate 22, although different materials can be utilized for the plates (e.g., composite materials of metal and plastic, etc.). Bottom plate 48 is shown in FIG. 2 to have a similar "quadrilateral" (e.g., four sides each of 16.5 cm length) peripheral shape as that of top plate 22, although the present invention includes arrangements wherein the top and bottom plates have differently configured peripheral outlines (e.g., star or triangular shaped peripheries).

As shown in FIG. 2, plate 48 includes sides 50, 52, 54 and 56 with adjacent sides being joined by rounded corners 60, 62 64 and 66. Fastener holes 68, 70, 72 and 74 are provided radially inwardly of the rounded corners as in the top plate. The fastener holes in both the top and bottom plates are preferably elongated slots for facilitating alignment and are holes that are formed in an external section in the top plate that are aligned with corresponding holes in the bottom plate.

With reference to FIGS. 1–5, the structure internal of the fastener holes is explained in greater detail. As shown best in FIGS. 1, 4 and 5, top plate 22 features external top plate section 76 which has inner circular boundary 78 and an external boundary represented by the combined edges defining sides 24, 26, 28 and 30 and rounded corners 32, 34, 36 and 38. External plate section 76 is preferably horizontally oriented such that top plate 22 can flushly abut against a supporting surface when bolts or the like are inserted into fastener holes 42, 44, 46 and 47. The opposite plate is preferably symmetric with respect to the external plate section and fastener holes. FIG. 3 illustrates attachment units or structures 49 and 51 which represent any one of a variety of components to which a swivel base is attached such as a chair base and upper chair seat combination, a table top/table base combination, an instrument display panel/instrument base combination, etc.

Figure 4:
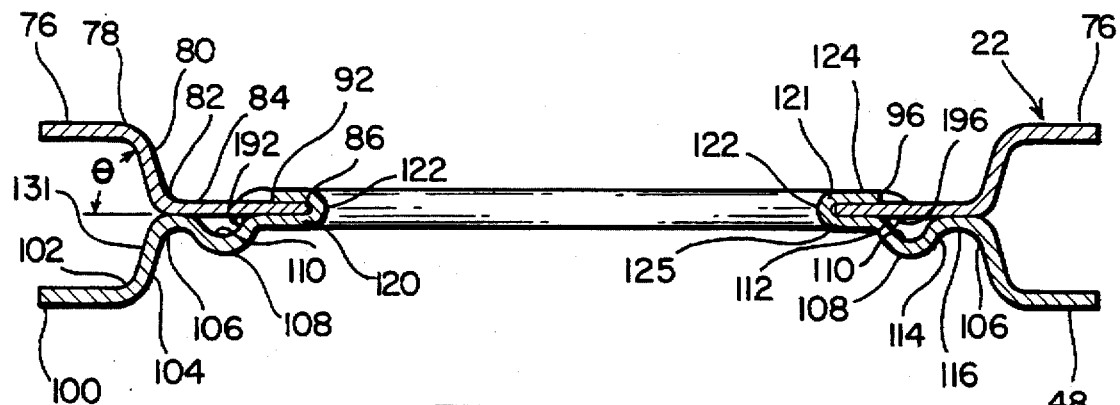
FIG. 4 shows a cross-sectional view taken along cross-section line IV—IV in FIG. 1.

Intermediate top plate section 80 extends inwardly off of boundary 78 and is integral therewith. Intermediate top plate section 80 also extends inwardly to inward boundary 82. Intermediate plate section 80 slopes downwardly and inwardly to form a conical shaped ring section between boundaries 78 and 82. The oblique intermediate plate section 80 preferably slopes at an angle of from 25° to 75° with respect to the horizontal which angle is depicted in FIG. 4 by angle Θ. Internal top plate section 84 extends inwardly off of boundary 82 and ends in internal circular edge 86. Internal top plate section 84 is preferably also horizontal and lies on a plane that extends parallel with external top plate section 76 only at a lower level.

Between boundary 82 and internal circular edge 86 are formed a plurality of semi-spherical hollow protrusions or reception housings 88, 90, 92, 94, 96 and 98. In a preferred embodiment six (6) or eight (8) of such protrusions are formed in section 84, although a lesser or greater number of such protrusions is also contemplated depending on the intended use (e.g., anticipated loads). Three bearings with housings can also be utilized in the present invention, but is less preferable than at least four. As shown in FIG. 1, the hollow protrusions are spaced along a circumferential ring (not shown) positioned between edge 86 and boundary 82 such that the protrusions are equally spaced apart (e.g., 60° for four (4) bearings).

With reference now to FIGS. 2–5, bottom plate 48 includes external bottom plate section 100 which is defined by circular boundary 102 on its inner side and on its outer side by a peripheral edge formed by sides 50–56 and corners 60–66. External bottom plate section 100 is preferably horizontal and also parallel with external top plate section 76. A suitable spacing is about 1 inch or 2.5 cm between the two external plate sections. External bottom plate section 100 has fastener holes 68–74 formed in it that are aligned with those in top plate 22.

Figure 5:
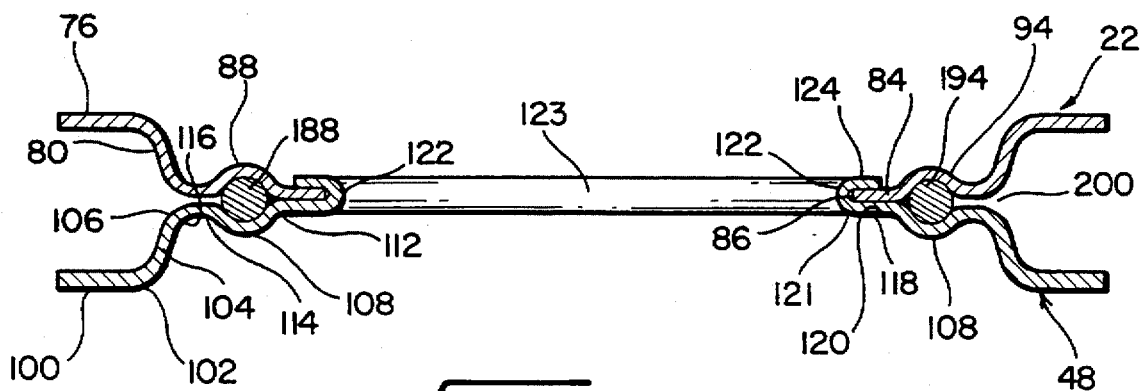
FIG. 5 shows a cross-sectional view taken along cross-section line V—V in FIG. 1.

Bottom plate 48 also includes sloping intermediate bottom plate section 104 which slopes upwardly and inwardly from boundary 102 to internal circular boundary edge 106 (see FIGS. 3, 4 and 5). Intermediate bottom plate section 104 preferably slopes at the same angle as its mirror image counterpart 80 in top plate 22.

Bottom plate 48 further includes uninterrupted ring shaped ridge 108 which is bulbous in cross-section so as to define a convex exterior surface and a concave recess 110 (FIG. 4). Ridge 108 has inner border edge 112 and outer border edge 114. Between inner border edge 114 and boundary edge 106 is formed valley section 116.

Bottom plate 48 further includes interior bottom plate section 118 which includes first portion 120 that is preferably horizontal and at the same level as valley section 116. Interior bottom plate section 118 also preferably extends parallel with external bottom plate section 100 and at a different level than bottom plate section 100. Interior bottom plate section 118 further includes a second portion which is identified as hook section 121. Hook-shaped section (or "hook section" for short) 121 extends off of first portion 120 and has a bottom component 125 (FIG. 4) in contact with a bottom surface of internal top plate section 84. Hook section 121 further includes a curved component 122 which wraps about and extends across internal circular edge 86 of top plate 22. Hook section 121 also features top component 124 extending outwardly and essentially horizontally. Top component 124 of hook section 121 has a bottom surface lying flush or essentially flush along its entire length on an upper surface of internal top plate section 84. Preferably, the average distance between the adjacent surfaces of the top and bottom components (124, 123) of hook shaped section 121 is equal to the first plate's thickness at its internal section plus an additional clearance of 0.001 to 0.5 times the first plate's thickness to facilitate sliding. A range of the thickness plus 0.01 to 0.5 times the thickness is even more preferred. Also, preferably the top and bottom components (124, 125) of the hook shaped section 121 are in a parallel relationship. As shown in FIG. 1, curved component 122 and top component 124 of hook section 121 are each circumferentially uninterrupted and extends about and over the entire circumference of circular edge 86. The present invention also contemplates having a series of circumferentially elongated tabs that are folded over into section 84 and have spaces formed therebetween. However, the circumferentially uninterrupted hook section 121 is much more preferred from the standpoint of stability, maintaining engagement with top plate 22 and providing a smooth wire contact surface without the requirement for a protective rim insert.

Curved component 122 of hook section 121 defines central aperture 123 which has a circular configuration and a diameter which is preferably larger than the maximum interior to exterior edge length of the top and bottom plates (along a horizontal plane). For instance, in a preferred embodiment, the diameter of central aperture 123 is 8 cm while the interior to exterior length (along the horizontal) for the plate is about 5 cm at a minimum and 7 cm (radially in from a corner edge) at a maximum. Curved component 122 also provides a smooth surface that would avoid degrading wires or the like extending through aperture 123. The tab arrangement noted above would not provide as smooth a surface unless coated or covered and therefor would be less preferably from the standpoint of an increased chance of fraying or scratching of material passed through aperture 123 such as, for example, piping, electrical wiring, optical fibers, force transferring tension cables, etc.

As represented by FIGS. 1, 3 and 5, spherical ball bearings are inserted within each of semi-spherical hollow protrusions 88, 90, 92, 94, 96 and 98. The number of hollow protrusions corresponds with the number of roller bearings and a preferred range is 6 to 8 ball bearings equally circumferentially spaced. The six ball bearings are illustrated in FIGS. 3, 4 and 5 and have been designated as bearings 188, 190, 192, 194, 196 and 198 to correspond with the respective hollow protrusions 88, 90, 92, 94, 96 and 98. The bearings have an upper portion nestled within the respective hollow protrusions and a bottom portion received in a circular groove defined by concave recess 100 defined by ridge 108. The diameter of the spherical bearings is preferably equal to or slightly larger than the combined height of the receiving areas defined by the depth of the upper hollow protrusions and lower concave recess, and the bearings are preferably formed of hardened steel or the like.

When the diameter of the ball bearings is equal with the combined height of the receiving areas, the internal ends of oblique walls 80 and 104 will be in sliding engagement at their internal ends (i.e., at boundaries 82 and 106) together with the portion of internal plate section received within hook-shaped section 121. More preferably, however the ball bearings are slightly larger than the receiving areas to space the internal ends of oblique walls 80 and 104 slightly apart (e.g., 1 cm diameter ball bearings which create a 1 mm gap). In other words, the vertical height between the deepest portion of the receiving areas is equal to or slightly greater than the ball bearing's diameter. This clearance can be modified depending upon the anticipate use and loads so that variations in the ease of swivel base rotation can be obtained. The clearance between the exterior of the bearing and the complementing curvature of the bearing reception areas can be modified by bending or forming the plates such that they have additional clearance externally to the external side of the bearing (e.g., borders 82 and 106 being spaced apart). FIGS. 3 and 5 illustrate gap 200 which is formed in such situations. FIG. 4 illustrates the former situation wherein the bearings are sized so as to place the interior boundaries of walls 80 and 104 in sliding engagement. In either case, the spacing (or non-spacing) is the same about the entire circumference of swivel base 20. Additional strength can be provided to the plates by adding stiffening ribs. For example, two to six stiffening ribs such as rib 131 shown by dashed line in FIG. 4 can be provided integral with the sloped section and extending between the horizontal internal and external sections of each plate. The ribs can also be provided on the opposite side of the sloped section either in addition to or in place of illustrated ribs 131.

Rather than semi-spherical hollow reception protrusions 88–98, elongated (e.g., extending 2 to 10 times the width) and circumferentially extending protrusions can also be relied upon with a continuous lower groove for greater rolling ease. The longer the reception protrusions, however, the greater the chance for a change in symmetry in ball bearing position which could result in certain components receiving greater loads. A circumferentially extending protrusion having ends spaced apart along a straight line equal to 1.3 to 2.5 times the diameter of the steel ball received therein is preferred for this type of embodiment. In each of the elongated protrusions one ball is placed, although other arrangements such as multiple bearings within elongated protrusions is also contemplated. Also, other types of bearing arrangements are also contemplated such as cylindrical bearings having an axis of elongation in common with a series of radial lines extending out from the center of the swivel base as well as corresponding reception ports and riding groove (not shown).

Figure 10:
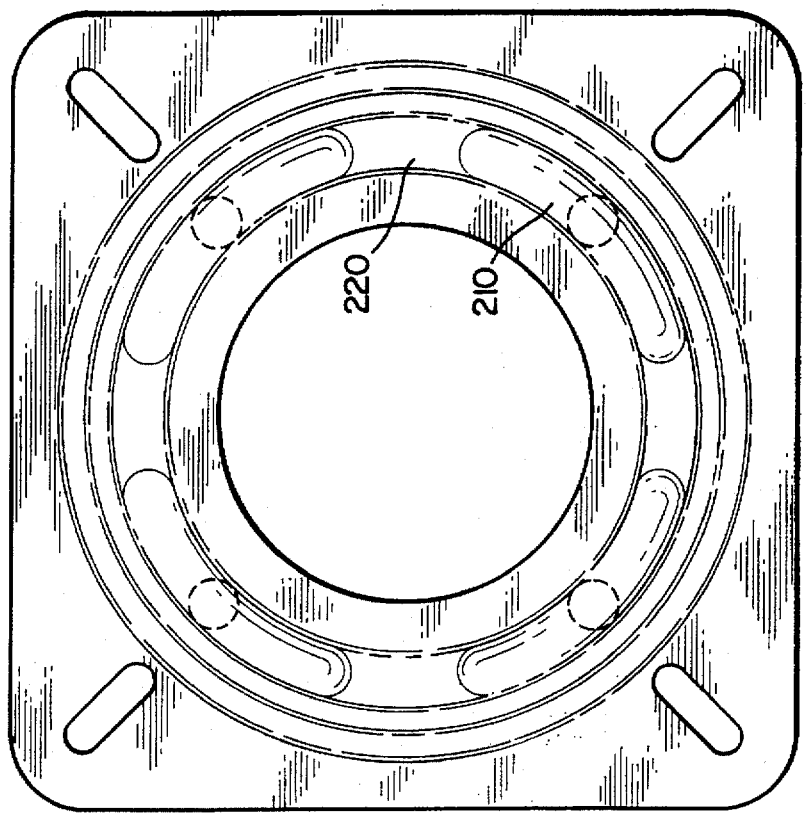
FIG. 10 shows a top plan view of a modified embodiment of the swivel base of the present invention with a limited rotation arrangement.
Figure 12:
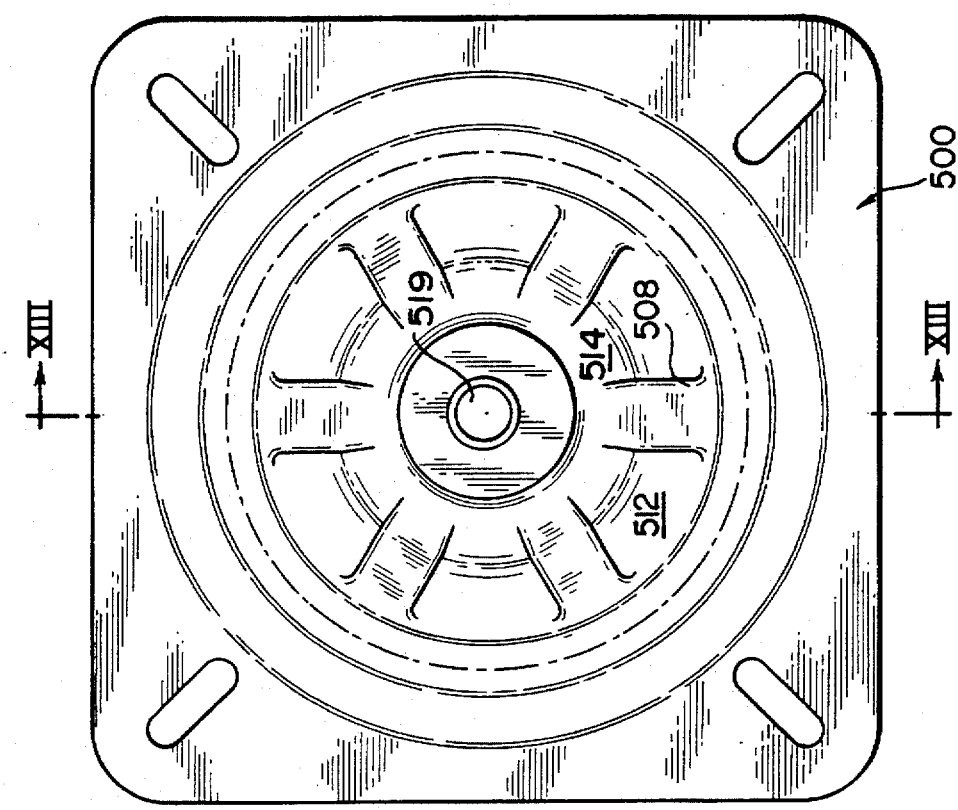
FIG. 12 shows a top plan view of a conventional swivel base over which the present invention is an improvement.

Further, in the above described embodiment the ball bearing riding groove 110 defined in bottom plate 48 is continuous. FIG. 10 illustrates an alternate embodiment of the invention wherein rather than a continuous groove a series of elongated circumferentially extending riding grooves are provided that are defined by raised portions 210 which are defined at their ends by the non-raised portions 220 positioned between raised portions 210. The ball bearings are retained in semi-spherical reception protrusions provided in the opposite plate as in the earlier embodiment. Accordingly, depending on the relative circumferential length of raised portions 210 and non-raised portions 220 the upper plate and/or lower plate will be subject to a limited degree of clockwise and counter-clockwise rotation, for example a 80° rotation capability as shown in FIG. 10.

Although plate 22 has been referred to as the "top" plate and plate 48 as the "bottom" plate, an opposite arrangement is also possible in the present invention, although less preferable. In other words, plate 48 with its hook section could represent the "top" plate and plate 22 the "bottom" plate in the final assembled position with respect to a device comprised of the swivel base. Also, top and bottom can be in reference to a horizontal surface or to even a vertical side wall such as may provide support to a swivel base with upper marked instrument.

Moreover, top component 124 preferably extends in an inward to outward direction for about 10–25% of the entire internal to external length of plate section 22 and 48 along the horizontal. For example, a 1 cm length for the top component and a total length (along the horizontal) between the curved component 122 and the closest point on an external periphery of plates 22 and 49 of 5 cm. Also, top component 124 also preferably radially extends outward from edge 86 of top plate 22 a distance which represents about 10 to 60% of the radial distance between edge 86 and boundary 82 and most preferably between 30 and 45% (e.g., 1 cm for the top component and 2.5 cm between edge 86 and boundary 82).

Plates 22 and 48 can be formed and assembled in a plurality of ways. For example, the plates can be formed in a cutting process, a molding process, a stamping process or any combination hereof. For instance, the plates' periphery, a central aperture and fastener holes can be cut into a blank either before or after a stamping process has been conducted to achieve the cross-sectional configuration shown in FIGS. 4 and 5. The thickness of the plates is preferably the same with 2 cm being suitable when the material is steel.

FIGS. 6–9 show one possible method for assembling the plates which are formed in a process such as the stamping and cutting process discussed immediately above.

Figure 6:
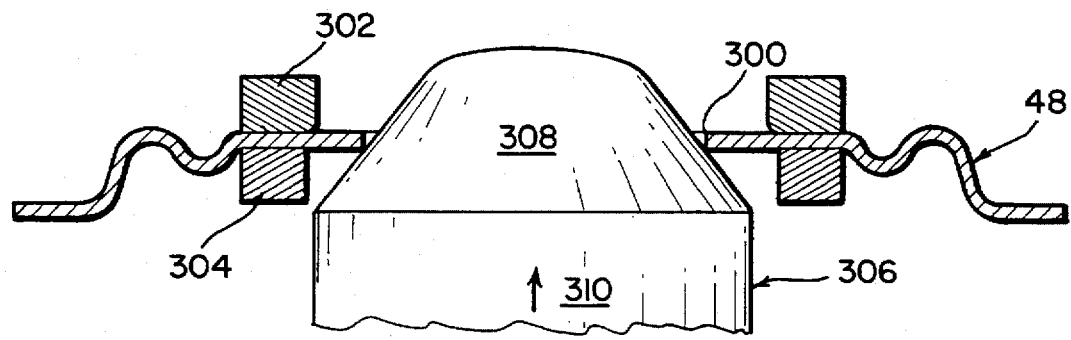
FIG. 6 shows a cross-sectional view of a bottom plate in an initial stage of swivel base construction.

FIG. 6 shows bottom plate 48 after being stamped an cut. As shown in FIG. 6, plate 48 has an edge 300 defining a central aperture which is of a smaller diameter than the resultant diameter 123 of the assembled swivel base 20 following hook section engagement. Plate 48 is maintained fixed in position by above positioned ring-shaped member 302 which extends radially between what will eventually become components 118 and 120 of plate 48 (see FIG. 5).

Ring shaped member can be brought into position and maintained in position by a hydraulic actuated cylindrical sleeve or the like (not shown). A similar ring-shaped member 304 is positioned below and on the opposite side of plate 48 and is supported by a suitable support such as an aperture stand (not shown).

Figure 7:
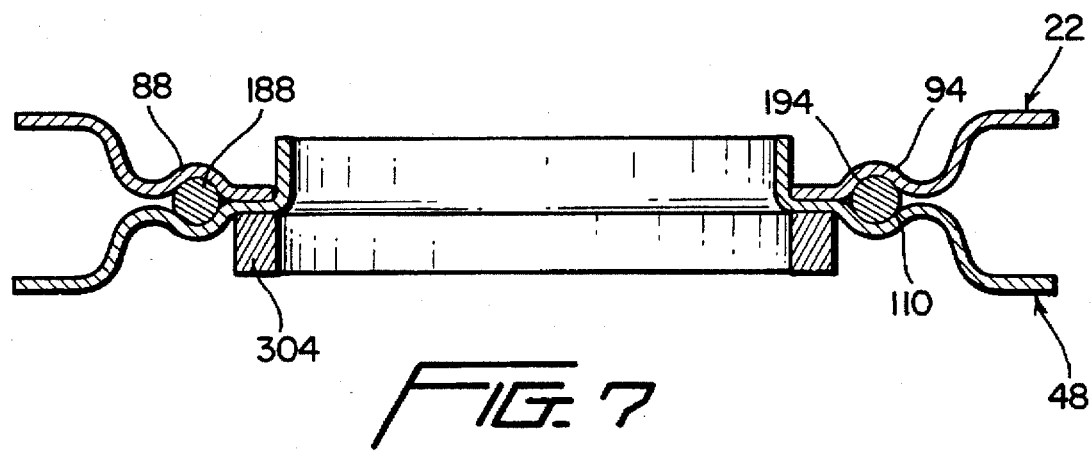
FIG. 7 shows a stacked arrangement for the bottom and upper plates in an intermediate stage of swivel base construction.

Punch member 306 with conical head 308 and cylindrical body 310 is inserted into aperture 300 and further pushed upwardly with respect to the fixed plate 48 until the interior section 118 of plate 48 assumes the shape shown in FIG. 7. Punch 306 and upper ring-shaped member 302 are then withdrawn while bottom ring-shaped member 304 is retained in position. Bearings 188–198 are then placed within groove 110 formed in bottom plate 48 and upper plate 22 is positioned thereover such that the bearings are received within corresponding semi-spherical reception protrusions such as 88 and 94 shown in FIG. 7. Grease or other lubrication material can be used to help position or preset the bearings during this stage of assembly and for facilitating sliding after assembly.

Figure 8:
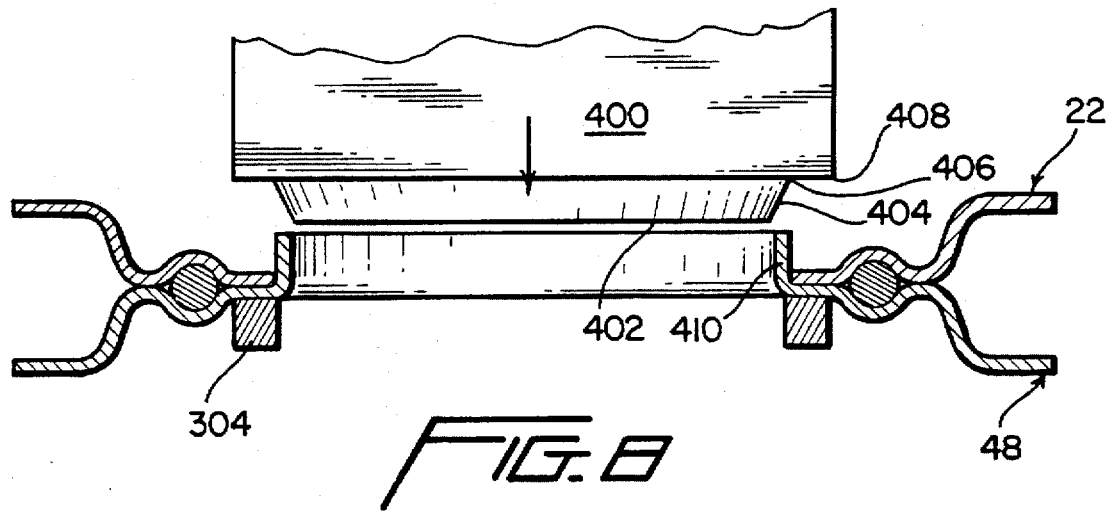
FIG. 8 shows the positioning of a compression die and support in position for a final stage of swivel base construction.
Figure 9:
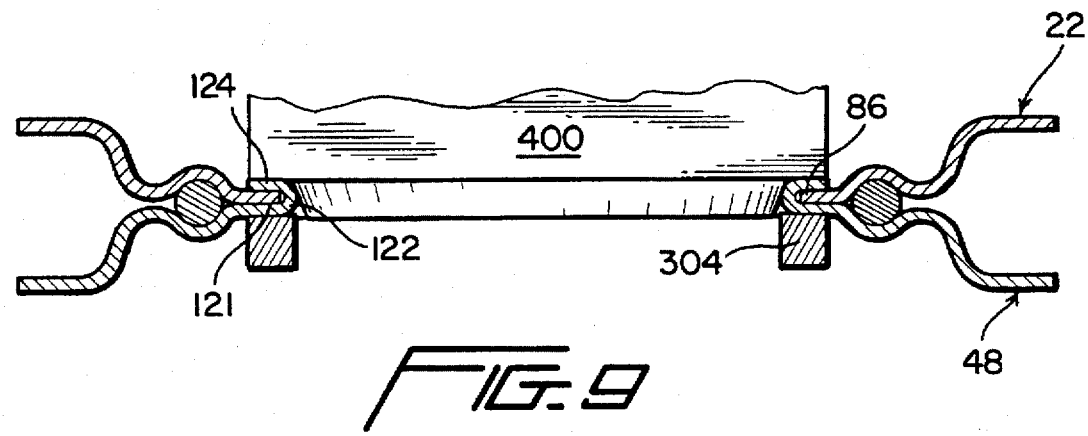
FIG. 9 shows the positioning of the die and support following completion of the final stage of swivel base construction.

FIG. 8 shows a second punch 400 positioned above top plate 22 with conical end 402 defined by tapered surface 404 which leads into smoothly contoured intermediate surface 406 and then into horizontal surface 408. When punch 400 is extended downwardly (e.g., telescoping out from within the raised cylindrical sleeve noted above for maintaining ring 302 in position) surfaces 404, 406 and 408 contact upwardly extending section 410 of plate 48 in sequence and reconfigure upwardly extending section 410 into the configuration shown in FIG. 9 and previously discussed and shown in FIG. 5. As shown in FIG. 9, top component 124 of hook section 121 frictionally engages with the underlying upper surface of top plate 22 and the interior of curved component 122 contacts edge 86 of top plate 22. The frictional engagement allows for relative rotation of the top plate with respect to the bottom plate as soon as the static frictional forces therebetween are overcome. The material and pressing operation is carried out and the material chosen so as to achieve the hook section configuration without causing a splitting along the periphery of curved component 122 and top component 124.

Figure 13:
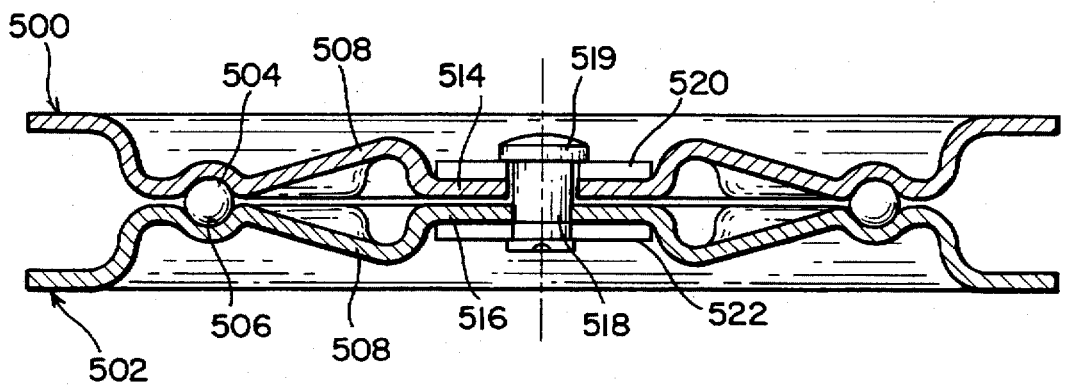
FIG. 13 shows a cross-sectional view taken along cross-section line XIII—XIII in FIG. 12.

In another preferred embodiment, a turning operation can be performed wherein one of both of a flanged tool and the stacked plates are rotated while the flanged tool-forces down upwardly extending section 410 as the tool moves along the circumference of the plates' central apertures. FIG. 13 is representative of one possible turning operation assembly. As shown in FIG. 13 chuck 700 includes a plurality of fixing rods 702 (one shown) which extend through each aligned set of fastener holes in plate 22 and 48. Turning wheel assembly 704 is shifted to initiate bending in upwardly extending member 410 (FIG. 8) and then wheel assembly 704 with respect to the stacked plates is moved along the circumference of internal edge 86 to reconfigure upwardly extending member 410 to achieve the hook section configuration.

Although the present invention has been described with reference to preferred embodiments, the invention is not limited to the details thereof. Various substitutions and modifications will occur to those of ordinary skill in the art, and all such substitutions and modifications are intended to fall within the spirit and scope of the invention as defined in the appended claims. For example, the bearing members may be replaced by low friction bearing surfaces (e.g., a TEFLON ring or reliance may be placed on the surface of the plates themselves. However, in view of the preferred frictional contact at the hook-shaped section the use of roller bearings (e.g., individual or a caged assembly) is preferred.

Also, the present invention includes within its scope a swivel base wherein each plate has a continuous ring-shaped groove; and the aligned grooves are packed with bearings. The present invention also includes within its scope an arrangement either with or without the hook shaped section with the unique semi-spherical housings in one plate and a continuous bearing riding groove in the opposite plate (or series of elongated grooves).

What is claimed is:

1. A swivel base, comprising:
    a first plate having an external peripheral edge and an internal circular edge; and
    a second plate having an external peripheral edge and a hook-shaped internal section defining an opening in said second plate, which hook shaped internal section includes a first component in contact with a first side of said first plate, a second, intermediate component extending across said internal circular edge, and a third component in contact with a second side of said first plate, the internal circular edge of said first plate being slideable within said hook-shaped internal section, and said hook shaped component engaging said first plate so as to prevent separation of said first plate and second plate in a direction along a central axis of a hole defined by the internal circular edge for a 360° range of rotation positions assumable by said plates with respect to each other.

2. A swivel base as recited in claim 1 further comprising:
    bearing members positioned between said first and second plates.

3. A swivel base as recited in claim 2 wherein said first and second plates include juxtaposed surfaces with means for receiving said bearing members such that at least one of said plates is free to rotate with respect to another by a combination of sliding action and rolling action.

4. A swivel base as recited in claim 3 wherein said first and second plates each include an external plate section, an internal plate section and an intermediate sloped plate section which extends between said internal and external plate sections.

5. A swivel base as recited in claim 4 wherein said external and internal sections of respective plates lie on parallel planes and wherein respective external sections of said first and second plates are in a parallel relationship and respective internal sections of said first and second plates are in a parallel relationship.

6. A swivel base as recited in claim 5 wherein said external and internal sections are horizontal and said external section in each of said plates includes fastener holes.

7. A swivel base as recited in claim 2 wherein said second component of said hook-shaped internal section is circumferentially continuous along the internal circular edge of said first plate.

8. A swivel base as recited in claim 7 wherein said second component represents an internalmost portion of said swivel base and extends about an internalmost edge of said first plate defined by said internal circular edge so as to form a central aperture in said swivel base, and said second component presenting a smooth, uninterrupted circumferential surface.

9. A swivel base as recited in claim 2 wherein said bearing members are roller bearings received within reception protrusions in one of said first and second plates and a plurality of circumferentially elongated and spaced groove sections formed in an opposite one of said plates which is free of said reception protrusions.

10. A swivel base as recited in claim 2 wherein one of said first and second plates includes a plurality of circumferentially spaced bearing reception protrusions and an opposite one of said plates includes a ring shaped riding groove, and each of said reception protrusions receiving one of said bearings which are also in contact with said riding groove such that said first and second plates are adapted to move with respect to each other by way of a combined sliding and rolling action, and wherein a vertical distance between a deepest portion of each of a pair of corresponding reception protrusions is equal to or greater than a diameter of a ball bearing received therebetween.

11. A swivel base as recited in claim 2 wherein said external peripheral edge of at least one of said first and second plates is multi-sided and includes fastener holes therein, and said internal circular edge defines a central aperture which has a diameter which is greater in length than any radial line extending between said second component and the external peripheral edge of said plate, and said second component having an interior surface which defines a central hole in said swivel base which shares a common central axis with the central aperture defined by the internal circular edge.

12. A swivel base as recited in claim 5, wherein said respective external sections are spaced further apart than said respective internal sections and said respective external sections extend to an outer periphery of said swivel base and are in a non-overlapping arrangement.

13. A swivel base as recited in claim 2 wherein said first and second plates each include an external plate section, an intermediate sloped plate section extending inwardly from said external plate section and an internal section which extends inwardly from said sloped section.

14. A swivel base as recited in claim 13 wherein said intermediate sloped plate sections each slope at an angle of from 25° to 75° between respective internal and external plate sections.

15. A swivel base as recited in claim 13 wherein said external plates extend horizontally and each of said intermediate sloped plate sections slopes at an angle of from 25° to 75° with respect to the horizontal.

16. A swivel base as recited in claim 13 wherein said top component extends radially outwardly from the internal circular edge of said first plate for about 10 to 50% of a radial length of the internal section of said first plate.

17. A swivel base as recited in claim 16 wherein said bearing members are spaced along a circumferential ring positioned between an external edge of said top component and an external boundary of the internal section of said first plate.

18. A swivel base as recited in claim 2 wherein said bearing members are spherical ball bearings.

19. A swivel base as recited in claim 18 wherein one of said first and second plates includes a plurality of reception protrusions for receiving a portion of said ball bearings and another of said first and second plates includes a continuous ring-shaped recess which receives another portion of said ball bearings.

20. A swivel base as recited in claim 1 wherein said second component is curved in radial cross-section.

21. An apparatus, comprising:
a first plate having an external peripheral edge and an internal circular edge defining a central aperture in said first plate;
a second plate having an external peripheral edge and a hook-shaped internal section defining an opening in said second plate, which hook shaped internal section includes a first component in contact with a first side of said first plate, a second component extending across said internal circular edge, and a third component in contact with a second side of said first plate, and the internal circular edge of said first plate being slideable within said hook-shaped internal section, and said second component defining a central hole in said swivel base which shares a common central axis with he central aperture defined by said internal circular edge;
a first attachment structure secured to said first plate; and
a second attachment structure secured to said second plate.

22. A swivel base as recited in claim 21, further comprising roller bearing members positioned between and in contact with said first and second plates.

23. A swivel base, comprising:
a first plate having an external peripheral edge and an internal circular edge;
a second plate having an external peripheral edge and an internal hook-shaped section which defines a central aperture in said second plate and which receives the internal circular edge of said first plate so as to slidingly engage the first and second plates, and said book section being continuous about an entire circumference of said internal circular edge;
said first and second plate sections each including at least one bearing reception area;
at least one bearing member positioned within the reception area defined by said first and second plates such that said plates are adapted to rotate under both a sliding and a rolling action.

24. A swivel base as recited in claim 23 wherein said plates each include an external section, an internal section and an intermediate sloped section extending between said internal and external sections and wherein said swivel base includes a plurality of ball bearings circumferentially spaced and received between said plates and within a corresponding number of said reception areas which are formed within the internal section of each of said first and second plates externally of an external edge of said hook-shaped section of said second plate.

25. A swivel base as recited in claim 23, wherein said hook shaped section has a first section in contact with a bottom surface of said first plate, an intermediate section extending across said internal circular edge an a third section in contact with a top surface of said first plate, and said intermediate section defining the central aperture being uninterrupted along an entire 360° circumference of said central aperture.

26. A swivel base as recited in claim 25, wherein said hook shaped section prevents said first and second plates from becoming separated along a central axial axis of said central aperture for all rotation positions about the 360° circumference of said central aperture.

27. A method for forming a swivel base, comprising:
stacking a first plate onto a second plate such that an outwardly extending circular flange of said second plate extends past a circular interior edge defining a central aperture in said first plate;
positioning bearing members such that said bearing members are between said first and second plates;
bending said outwardly extending flange so as to form a hook section which includes a top component in contact with an upper surface of said first plate, a curved component adjacent the circular interior edge of said first plate and a bottom component in contact with a lower surface of said first plate, said hook section being continuous circumferentially about the circular interior edge and providing a sliding friction engagement between said first and second plates.

28. A method as recited in claim 27 further comprising forming said plates so as to include in one of said plates a plurality of circumferentially spaced reception protrusions and in an opposite of said plates a continuous riding groove and stacking said plates such that said bearing members are received within said reception protrusions and said riding groove.

29. A swivel base, comprising:

a first plate having an external peripheral edge and an internal edge defining a central aperture in said first plate; and a second plate having an external peripheral edge and a hook-shaped internal section, which hook shaped internal section includes a first component in contact with a first side of said first plate, a second, intermediate component extending across said internal edge, and a third component in contact with a second side of said first plate, the internal edge of said first plate being slideable within said hook-shaped internal section, and the hook shaped internal section extending about an entire periphery defined by said internal edge.

30. A swivel base as recited in claim 29, wherein said second component is curved in radial section about said internal circular edge and defines an internalmost circular hole in said swivel base which shares a common central axis with a central aperture defined by said first plate.

31. A swivel base as recited in claim 29, wherein said second component is ring shaped and uninterrupted along an entire circumference of a central aperture defined by said internal circular edge, and said hook shaped component precludes separation of said plates in a direction along a central axis of the central aperture defined by said internal circular edge for all relative rotation positions between said plates.

* * * * *